Sept. 16, 1969 R. M. POLACK 3,467,771

CLOSED CIRCUIT DETERRENT SYSTEM

Filed March 12, 1968 2 Sheets-Sheet 1

INVENTOR.
ROBERT M. POLACK
BY Price, Heneveld
Huizenga & Cooper
ATTORNEYS

INVENTOR.
ROBERT M. POLACK
BY Price, Heneveld, Huizenga & Cooper
ATTORNEYS

United States Patent Office 3,467,771

Patented Sept. 16, 1969

3,467,771

CLOSED CIRCUIT DETERRENT SYSTEM

Robert M. Polack, Grand Rapids, Mich., assignor to Commercial Machinery Corporation, Grand Rapids, Mich., a corporation of Michigan Filed Mar. 12, 1968, Ser. No. 712,556
Int. Cl. H04n 5/76
U.S. Cl. 178—6.6 10 Claims

ABSTRACT OF THE DISCLOSURE

A closed circuit deterrent system suitable for utilization in banks and the like having one or more television cameras operatively connected to a video tape recorder. The recorder is actuated selectively by money-presence sensors in the cashiers drawers or switches positioned adjacent each cashier station. The recorder also has a sound track and microphones are provided at each of the cashier stations. The system performs the dual function of recording the image of a bank robber during the robbery and, additionally, recording the photographic image of persons conducting ordinary bank transactions. In the latter case, the cashier records on the sound track the transaction identification.

This invention relates to crime deterrent systems and, more particularly, to such systems adapted for utilization in banks or like places of business.

The number of bank robberies occurring annually has increased sharply in the past few years. These robberies are executed, usually, by the so-called "amateur criminal" who approaches one or more of the cashiers during banking hours and, under threat of bodily harm, demands that he empty his cash drawer into a sack or the like. It is more-or-less standard policy in the banking industry to instruct tellers or cashiers, when confronted with such a robbery, to comply exactly with the criminal's request as a means of avoiding injury. No sudden or unusual motions can be made by the cashier and, consequently, the robbery is usually completed without the triggering of an alarm, camera or the like.

A number of solutions, many of which involve close-circuit television, have been proposed for recording the photographic image of the robber during the robbery attempt such that he may be readily identified and apprehended after leaving the bank. In such systems it is necessary, of course, to either run the video-tape recorder continuously during banking hours or, alternatively, provide some means of actuating it by the teller or cashier during the initial stages of the robbery. Where the former procedure is utilized, it has become customary to use a closed loop of magnetic tape on the recorder which erases and re-records at, for example, fifteen minute intervals. Such a tape, thus, would always contain a record of the transactions in the bank during the immediately preceding fifteen-minute period.

While such systems have met with some degree of success, the constant erasure of the record renders the system adaptable only to use in the robbery and the cameras, recording equipment and the like cannot be utilized for other desirable purposes such as recording a permanent image of a check cashier or other customer. It is not feasible economically, of course, to supply a sufficient amount of recording tape to record and preserve the entire daily happenings of the banking operation.

In United States Patent No. 3,300,770, there is illustrated a triggering mechanism for a television camera, motion picture camera, burglar alarm or the like which can be operated by the teller or cashier without making any unusual motions during a robbery. It is the principal object of the instant inveniton to utilize such a triggering device in conjunction with a closed-circuit television and sound system to provide a crime deterrent system effective to record photographically the images of bank robbers during the robbery as well as the images of persons conducting ordinary banking transactions along with an identification of the particular transaction in question.

It is an object of this inveniton, thus, to provide a system of the type described wherein the magnetic recording tape or the like upon which a record is impressed by the recorder is utilized only during those times in which it is desired to record a particular happening and, thus, wherein the quantity of tape utilized renders it economically feasible to preserve the tape for as long of a period as is desired.

It is yet another object of this invention to provide a system of the type described effective to record sound as well as photographic images, the sound track being utilized as a transaction-identifying means during typical transactions wherein it is desirable to retain the image of the customer and as a means for recording the voice or voices of criminals during a bank robbery.

It is still a further object of this invention to provide a system of the type described which may be utilized in relatively large banks requiring a number of television cameras for the generation of satisfactory images at all critical locations within the bank without the necessity of providing highly complicated and expensive image-splitting equipment to prevent the individual scan areas of the cameras from being recorded simultaneously by the recording device.

These as well as other objects of this invention will be readily understood by those skilled in the art with reference to the following specification and accompanying drawings in which:

FIG. 1 is a schematic, plan view of a typical business counter at a bank or the like;

Briefly, this invention comprises a crime deterrent system suitable for utilization in banks or the like having at least one cashier station in the interior thereof. The system has at least one television camera positioned within the bank having its field of view directed such as to encompass at least that portion of the interior where the customer stands when he is transacting business at the cashier station. Selectively operable video recorder means are connected to the camera for recording the image scanned thereby. A money presence sensing means is provided in at least one compartment of the cash drawer, the sensing means functioning to actuate the recorder when all of the money is removed from that particular compartment. Additional switch means are provided at the cashier station for activating the recording unit, preferably for a predetermined time period, in the event that it is desired to photograph and retain the image of a customer cashing a check or the like. A further aspect of this invention is the incorporation into the system described above of a sound system whereby the teller or the like may identify a particular transaction when the image of the customer involved therein is being recorded.

The sound system functions, additionally, to record any words which are spoken by a robber or his accomplice during a bank robbery.

Figure 1:
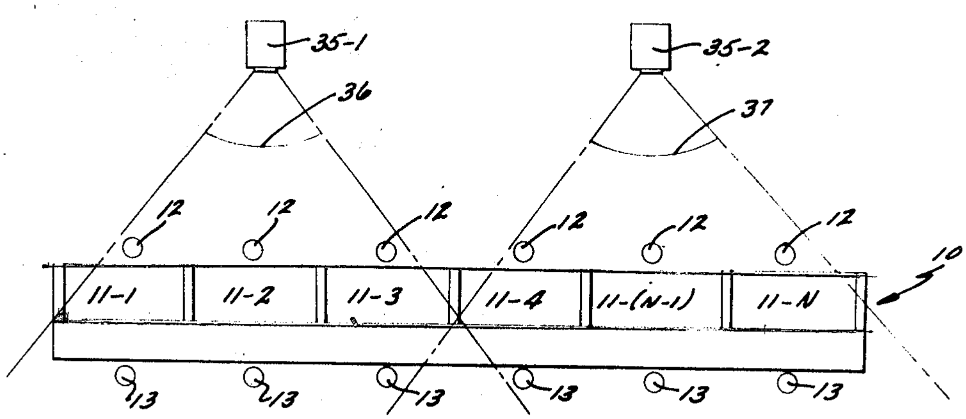

Referring now to the figures, a preferred embodiment of this invention will be described in detail. FIG. 1 illustrates schematically in plan view the cashier section of a typical bank interior. An elongated counter 10 has a series of cashier stations 11–1 through 11–N positioned therealong. The cashiers or employees 12 stand behind the counter while the customers 13 stand in front thereof during the conduction of business transactions.

Figures 2, 3, 4, 5:
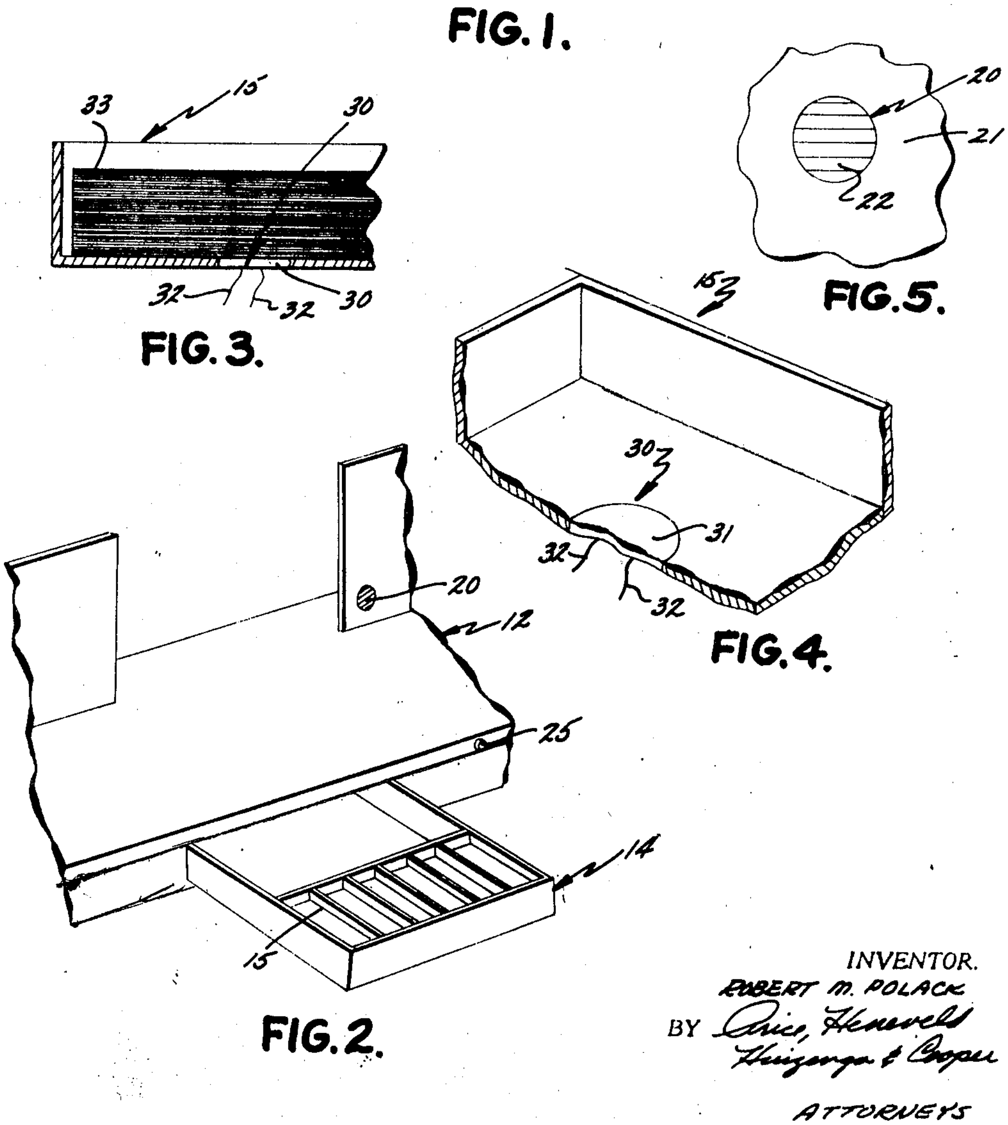
FIG. 2 is a fragmentary, perspective view of the counter from the rear side thereof.
FIG. 3 is a fragmentary elevational view, partially in cross section, of a money compartment in the cash drawer.
FIG. 4 is a fragmentary, perspective view, partially in cross section, of the compartment shown in FIG. 3 with the bills removed therefrom.
FIG. 5 is a fragmentary, front-elevational view of a typical microphone installation.

Referring now additionally to FIG. 2, the rear side of the counter 10 adjacent which the employee stands or sits is conventionally provided with a cash drawer 14 having a series of compartments 15 therein. While the preferred embodiment of this invention illustrates the utilization of a drawer for money-storing purposes, it will be readily apparent that the teachings of this invention are equally applicable to other types of storage devices such as bins within which the money is placed by the cashier for storage.

The instant invention contemplates the positioning of at least two and preferably three control and/or sensing devices at each of the cashier stations 11. The necessary of these are a push-button or other type of switch 25 and a money-presence sensor 30. Included preferably, additionally, is a microphone 20. While the positioning of the microphone 20 and switch 25 is not critical, these items may be placed at the station in the manner illustrated in FIG. 2, the microphone being permanently installed into the cabinet and the button 25, similarly, being placed at the rear thereof adjacent the teller or cashier's fingertips. The button 25, however, is not utilized secretively during a robbery or the like and, thus, may be placed so as to be visible to customers should such placement prove to be desirable for one reason or another.

Each of the microphones 20, as illustrated in FIG. 5, comprise a recess in the cabinet 21 covered by a suitable fabric or metallic screen 22. The working elements of the microphone, of course, are placed within the recess and the electrical leads therefrom run into a suitable conduit or the like which is conveniently located with respect to the counter 10. The leads from the push-buttons 25 and the money-presence sensors 30 may be routed to the control circuitry to be described hereinafter in similar fashion.

FIGS. 3 and 4 each illustrate one of the compartments of the cash drawer 15 which is positioned adjacent each cashier station. Embedded within the bottom of at least one of the compartments 15 is a light-sensitive device such as a light-sensitive resistance 31. The resistance or other type of light-sensitive element 31 is connected to the central control circuitry via leads 32.

The money-presence sensing element 30 may be fabricated, conveniently, in accordance with the teachings of United States Patent No. 3,300,770 noted previously with the exception that the translucent plate therein shown is not particularly necessary to carry out the concepts of the instant invention. When all of the money 33 is removed from the particular compartment 15 within which the sensor 30 is located, light will strike the sensor and either close or open the circuit 32, depending upon the particular type of sensor 31 being utilized. This signal, as noted previously, is transmitted to the control circuitry and utilized in a manner to be described in detail hereinafter.

Referring again to FIG. 1, the instant invention contemplates the positioning of one or more closed-circuit television cameras 35 within the interior of the bank or other building in such a manner that at least one of the cameras will be properly focused upon a customer standing in front of each of the cashier stations 11–1 through 11–N. In the embodiment illustrated in FIG. 1, the cameras 35–1 and 35–2 are positioned to the rear of the cashiers and embedded in the wall or the like at sufficient height to scan downwardly and catch the customer's face and shoulders without blocking by the cashiers 12. The scan field 36 or camera 35–1 covers stations 1 through 3 and the scan field 37 of camera 35–2 covers stations 4 through N. The cameras 35–1 and 35–2 are operative preferably constantly during banking hours, although the images scanned thereby are recorded selectively in a manner to be described hereinafter.

Figure 6:
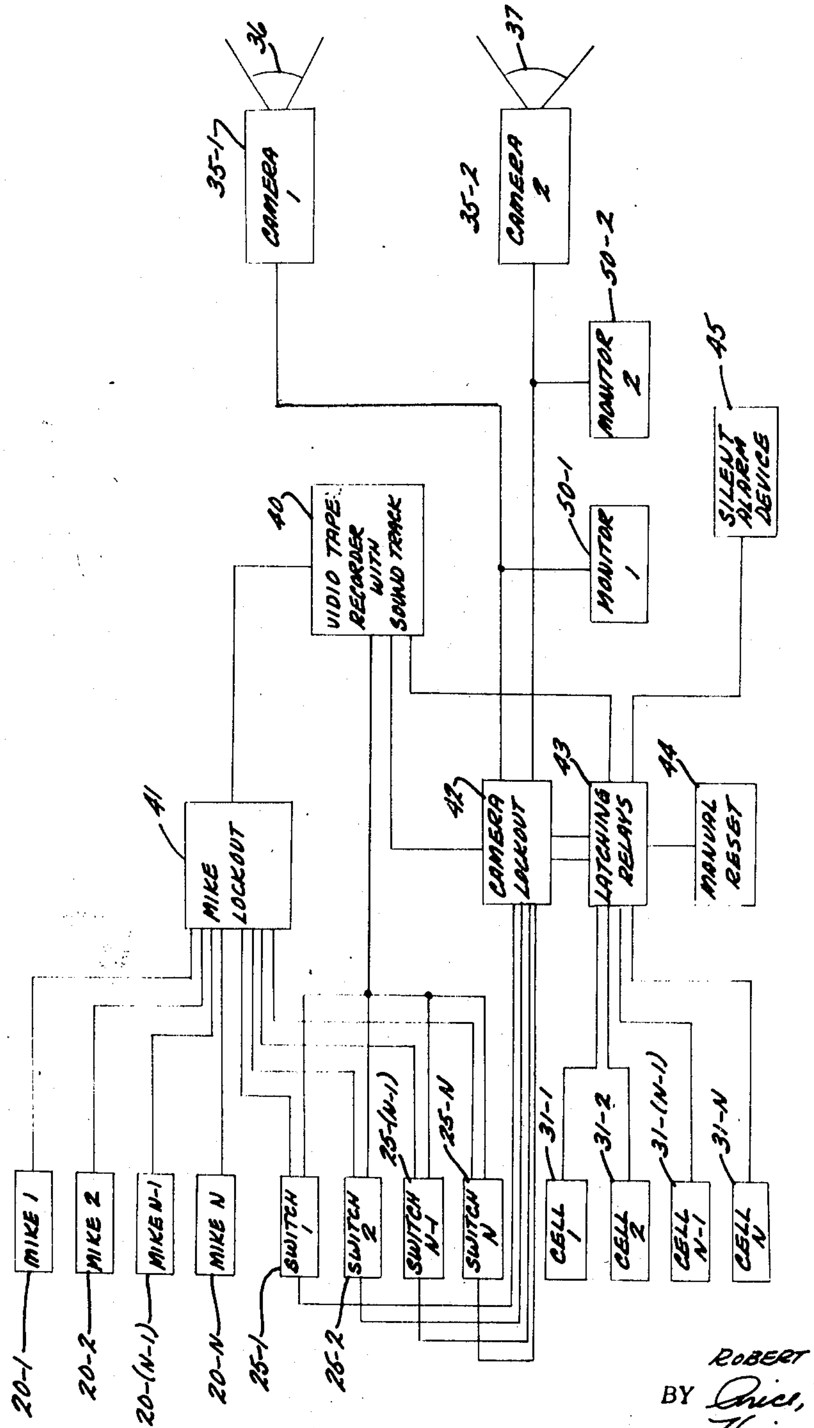
FIG. 6 is a block diagram of a closed-circuit video and sound system suitable for utilization in the present invention.

Referring now to FIG. 6, a video tape recorder 40 suitable additionally for sound recording is positioned at a safe location within the particular bank or alternatively at a remote central location. In the latter case, of course, the information may be transmitted to the recorder 40 via leased telephone lines or the like as will be readily apparent to those skilled in the art. The recorder 40 is actuated either by the switches 25–1 through 25–N or, alternatively, through triggering of the light-sensitive cells 31–1 through 31–N by removal of all of the money from thereover.

The switches 25 are utilized by the cashiers to instruct the recorder 40 to retain the visual image of a person who has come to the bank to cash a check or the like. Preferably, these switches are delay switches such that after momentary depression thereof they will cause the recorder 40 to operate for a period of approximately 15 seconds and then deactivate it. In this situation, the cashier pushes the switch 25 adjacent his or her particular station to activate the video tape recorder. The pushing of a particular switch results in (1) a lockout of all of the microphones except the microphone associated with the particular switch depressed; and (2) a lockout of all of the cameras except that particular camera whose field of view encompasses the station at which the switch is depressed. By depressing the switch thus, the cashier, during recording of the customer's image, may speak into his particular microphone information concerning the transaction such as the check number, the name of the party and the like. The information will be recorded upon the recording medium alongside the visual impression of the customer for later recall if necessary. During this period, the remainder of the microphones are locked out or turned off by lockout device 41 and, consequently, there will not be interference from ordinary conversations and the like occurring at the remainder of the cashier stations.

Depression of one of the switches 25 also, as noted, locks out or "turns off" all of the cameras 35 except that camera associated with the particular station at which the transaction is taking place. The provision of the camera lockout system 42 permits utilization of the system without the incorporation of highly complicated and expensive screen-splitting equipment and, consequently, renders the system much more attractive from an economic standpoint to banking institutions and the like. In this regard it should be noted, however, that some means (not shown) must be provided at each of the cashier stations to advise that particular cashier that the recording system is currently in use. These means might take the form of a light or the like which should not, of course, be wired in such a manner as to turn on during any period in which the recorder has been actuated by means of the money-presence sensors 31. Such a hookup will prevent any possibility of a robber becoming aware that he is being photographed during a robbery, and may be accomplished easily by merely disabling all of the switches 25 upon actuation of one of the money-presence sensors 31.

Each of the money-presence sensors 31 is connected to the camera lockout 42 and the recorder 40 by way of a bank of latching relays or the like 43. The latching relays prevent deactivation of the recorder 40 in the event that the drawer is closed (and thus light shut off from the sensing element 31) subsequent to the removal of the money 33 therefrom. The latching relays 43 must be manually reset by a button 44 or the like and this will be accomplished subsequent to departure of the robber from the premises. The light cells 31 feed via the latching relays 43 to the camera lockout device 42. Depending upon which light cell 31 has been activated, all but one of the cameras will be locked out of the system. The camera permitted to feed to the recorder, of course, will be the camera whose scan field 36 or 37 includes the station at which the cell in question has been activated and, thus, at which the robbery is occurring.

Activation of the video tape recorder via the latching relays 43 does not, in the embodiment illustrated, lock any of the microphones 20 out of the circuit. During the interval of a robbery, therefore, sounds picked up at each of the microphones will be recorded onto the audio portion of the recording tape. This will be desirable ordinarily because of the importance of picking up everything that is said within the bank during the period of the robbery. As will be appreciated readily, however, it may actually detract from identification of the single robber who is talking adjacent one of the microphones while the other microphones are still activated. Robbers of this type ordinarily do not talk, but work by way of passing a note to the cashier or teller and, consequently, the system shown is deemed preferable for the usual banking installation.

The functional capabilities of the system may be expanded by providing a monitor 50 for each of the cameras 35. The monitors 50 may be placed, for example, in the manager's office and by scanning the monitors, he will be able to ascertain instantly the status of the bank interior as regards the number of customers and the like. If desired, additionally, a silent alarm device 45 may be provided in the manager's office. This device, which may take the form, for example, of a blinking light, will be latched on by the relays 43 when one of the money-presence sensors 31 is activated and, thus, the manager will know that a robbery is taking place or, alternatively, that a teller or cashier has inadvertently triggered the recording device 40 by removing all of his or her money from the compartment in question.

Assume, for purposes of illustration, that a robber has entered the bank and approached teller cage 11–2. Assume, additionally, that he has requested the cashier to remove the money from her drawer and place it in a paper sack. Up to this point in the robbery, the image of the robber is displayed only upon the monitor 50–1 in the manager's office. As the teller or cashier removes the money from her drawer and places it in the bag or the like, however, the light resistor 31–2 will become exposed to the light and the closing or opening of the circuit will cause relay 43 to latch in a predetermined manner. The latching of relay 43 (1) locks camera 35–2 out of the recording system; and (2) initiates operation of video tape recorder 40 in such a manner that it begins to record the image viewed by camera 35–1. Since scan field 36 encompasses the customer position behind station 11–2, the robber's image will be continually recorded upon the tape thereafter during his stay in the bank. Any sound picked up by any of the microphones, additionally, will be transmitted to the recorder for preservation on the audio portion of the tape.

Simultaneously with the activation of the video tape recorder 40, the silent alarm device 45 in the manager's office will flash. The manager can check immediately by scanning the monitors 50–1 and 50–2 if in fact a robbery is occurring. If such appears to be the case, he can telephone the police immediately, and if such appears not to be the case, he may, after a reasonable delay, proceed into the customer area to ascertain the cause of the alarm. Subsequent to departure of the robber, the manager will push manual reset button 44 which will deactivate the recorder and re-arm the system. The visual image and sound recording relating to the robber, however, will be retained upon the tape in the recorder for examination by the police as an aid to identification and apprehension of the felon.

Suppose, again by way of explanation, that a robbery is not occurring but a customer has approached the cashier at station 11–4 to cash a check and for one reason or another the teller wishes to record the visual image of the customer along with a description of the transaction. The teller at station 11–N will push delay switch 25–N which will activate the recorder 40 for a predetermined period of time, for example, 15–20 seconds. The activation of delay switch 25–N functions to (1) lock all of the microphones out of the system except microphone 20–N; (2) lock camera 35–1 out of the system; and (3) activate recorder 40. While camera 35–2 and recorder 40 are recording the visual image of the customer, the teller will state in the microphone 20–N the identification of the transaction along with any details pertinent thereto. After a period of 20 seconds or the like, the recorder 40 will shut off automatically and that portion of the tape representative of the transaction which has just occurred will be preserved on the takeup spool thereof.

As many cameras may be utilized in the instant system as necessary to properly view the customer area in front of each of the teller stations. The camera lockout system 42, as noted, will lock all of the cameras except the particular one viewing the image which it is desired to record out of the recording system during any recording sequence. Individual monitors may be provided for each of the cameras, however, so that the manager will be able to scan the status of the entire banking area. The number of cameras required will depend, of course, upon the physical characteristics of the banking establishment as well as the number of cashier stations which it is desired to monitor.

While a preferred embodiment of this invention has been illustrated in detail, it will be readily apparent to those skilled in the art that other embodiments may be conceived and fabricated without departing from the spirit of this specification and the accompanying drawings. Such other embodiments are to be deemed as included within the scope of the following claims unless these claims, by their language, expressly state otherwise.

The embodiments of the invention in which an exclusive property or privilege is claimed are defined as follows:

1. A crime deterrent system for utilization in the interior of banks or the like having at least one cashier station with a cash receptacle therebehind, said system comprising:

a television camera having its field of view directed such as to encompass at least that portion of said interior where the customer stands when he is conducting business at said station:

video recorder means connected to said camera for recording selectively images scanned thereby;

dual activation means for said recorder means including a money presence sensing means in at least one compartment of said cash receptacle, said sensing means being connected to said recorder means such as to cause said recorder means to be actuated when all of the money is removed from said compartment during a robbery or like occurrence and manual switch means positioned at said station for activating said recorder means when it is desired to record the image of a person conducting business such as cashing a check or the like thereat.

2. The apparatus as set forth in claim 1 wherein said recorder means also includes audio recording means and which further comprises a microphone positioned adjacent said station and connected to said recorder means whereby a description of the particular transaction being conducted may be recorded along with the image of the person involved in said transaction.

3. The apparatus as set forth, in claim 1 which includes more than one camera and which further comprises means for locking out from the recorder upon actuation thereof all cameras except the one having a field of view encompassing the particular station from which the recorder has been actuated.

4. The apparatus as set forth in claim 2 which includes a series of said stations, each having one of said sensing means and one of said manual switch means and wherein a microphone is positioned adjacent each of said stations, and which further comprises means for locking out from the recorder upon actuation thereof by one of said switch means all microphones except the one positioned adjacent the particular station from which the recorder has been actuated by said switch means.

5. The apparatus as set forth in claim 1 wherein said sensing means is light responsive and which further comprises means for latching said recording means into its activated state after an initial response at said sensing means, reset means being provided for deactivating said recording means thereafter.

6. The apparatus as set forth in claim 1 wherein said camera is actuated constantly during business hours and which further comprises a monitor positioned out-of-sight of said station for constantly displaying the images scanned by said camera.

7. The apparatus as set forth in claim 1 which further comprises alarm means activated by said money presence sensing means, said alarm means being positioned out-of-sight of said station.

8. The apparatus as set forth in claim 1 wherein said manual switch means includes means for causing said recorder means to remain activated for a predetermined time period following momentary activation of said switch means.

9. A crime deterent system for utilization in the interior of banks or the like having a series of cashier stations with cash storage means therebehind, said system comprising:

at least two television cameras having their fields of view directed so as to encompass different portions of the interior of said bank, each of said portions including at least one segment of said interior where the customer stands when he is conducting business at one of said stations;

sound pickup means at each of said stations; video recorder means and sound recorder means for recording selectively images scanned by said cameras and sounds picked up by said pickup means;

money-presence sensing means in at least one compartment of each of said cash storage means, said sensing means being connected to said recorder means to cause said recorder means to be actuated when all the money is removed from at least one of said compartments;

manual switch means positioned at each of said stations for activating said recorder means to record the visual image of persons conducting business at a particular station and to record by the pickup means at said particular station an audible identification of the particular transaction being conducted; and lockout means for locking out all cameras from said recording means upon activation of one of said money-presence sensing means or one of said switch means except the camera whose field of view encompasses that segment of said interior adjacent the station having the sensing means or switch means associated therewith which has been activated and for locking out all pickup means from said recording means upon activation of one of said switch means except that pickup means associated with the station having the switch means which has been activated.

10. The apparatus as set forth in claim 9 wherein said manual switch means includes means for causing said recorder means to remain activated for a predetermined time period following momentary activation of said switch means.

References Cited

UNITED STATES PATENTS

| | | | |
|---|---|---|---|
| 3,148,932 | 9/1964 | Simjian | 346—22 |
| 2,212,660 | 8/1940 | Durbin. | |
| 2,909,767 | 10/1959 | Zaltman | 340—276 |
| 3,278,680 | 10/1966 | Hummel | 178—6.8 |
| 3,300,770 | 1/1967 | Brousseau et al. | 340—221 |

ROBERT L. GRIFFIN, Primary Examiner

D. E. STOUT, Assistant Examiner

U.S. Cl. X.R.

340—211, 277, 280